J. Garsed
Hand-Truck.
N° 76907  Patented Apr. 21, 1868.

Witnesses,
Chas M. Morgan
Isaac R. Cakford

Inventor,
Joshua Garsed

United States Patent Office.

JOSHUA GARSED, OF FRANKFORD, PENNSYLVANIA.

Letters Patent No. 76,907, dated April 21, 1868.

IMPROVED HAND-TRUCK.

*The Schedule referred to in these Letters Patent and making part of the same.*

TO ALL WHOM IT MAY CONCERN:

Be it known that I, JOSHUA GARSED, of Frankford, county of Philadelphia, and State of Pennsylvania, have invented a new and useful Improvement in "Hand-Trucks;" and I do hereby declare that the following is a full, clear, and exact description of the construction and operation of the same, reference being had to the accompanying drawings, making a part of this specification, in which—

The object of my invention consists in arranging a hand-truck, as hereinafter described, so that it can be turned abruptly around in any direction desired, without upsetting, or ripping up the floor.

To enable others skilled in the art to make and use my invention, I will now proceed to describe its construction and operation.

Figure 2:
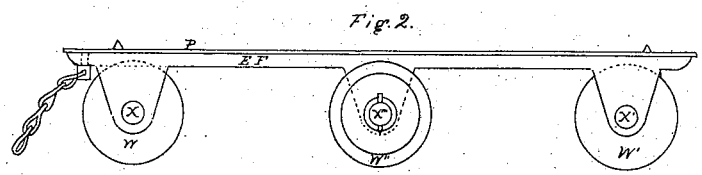
Figure 2 is a side view of same.
Figure 3:
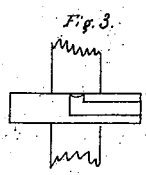
Figure 3 is a detached view, showing the arrangement for oiling the axles.
Figure 1:
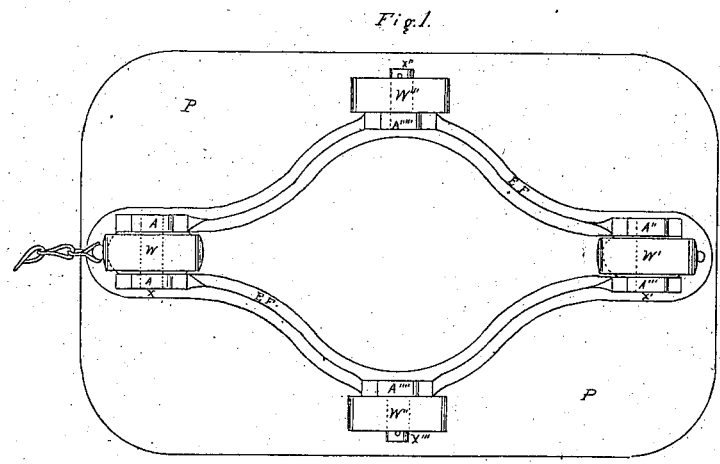
Figure 1 is a bottom view of my hand-truck.

E F, fig. 1, is a metallic elliptic-shaped frame, with the ends elongated. On the ends of said frame are cast or formed four arms or projections A, A', A'' and A''', placed at a sufficient distance apart to allow freedom of motion to the wheels W and W'. Passing through the lower part of the arms A, A', A'', and A''' are axles X and X', the centre of said axles being bored out in the manner as shown in fig. 3, for the purpose of entering oil to lubricate them. On the sides of the frame E F are arms A'''' and A''''', said arms having cast or formed on them, at right angles, axles X'' and X''', and on which revolve wheel W'' and W'''. Cast with or made separate, and bolted or riveted on to frame E F, is a metallic platform, P, said platform being of any desired dimensions, and made with openings on each end, immediately over wheels W and W', for the purpose of cleaning out any dirt that may accumulate. On a line, and at each corner of the platform P, are placed four metallic points, for the purpose of preventing articles from sliding off the truck when it is swung around. Wheels W and W' are slightly rounded off on the face, and made smaller in diameter than wheels W'' and W''', or the wheels can be all made of the same diameter, and W'' and W''' raised a little higher, so that the load on the truck will rest only on three wheels. For instance, the wheels W, W', and W'''' are on the floor, and W' raised clear of it; now, when the truck is turned, W''' and W'''' act as a pivot, and wheel W, being rounded, allows the truck to be turned around with ease, without injuring the floor.

If it is desired, the wheels and axles can be cast in one piece, and the arms made with the lower ends open, and provided with caps, which fit over the axles and hold them in place. In this case the arms for all the wheels are constructed similar to arms A and A', with the exceptions above noted. The truck can also be applied permanently to large bodies, and is especially adapted for use in dye-houses. In such cases the platform P is dispensed with.

Having thus described my invention, its construction and operation, what I claim, and desire to secure by Letters Patent of the United States, is—

The within-described hand-truck, constructed and operating substantially as specified.

JOSHUA GARSED.

Witnesses:
CHAS. W. MORGAN,
ISAAC R. OAKFORD.